United States Patent
Hayashi et al.

(10) Patent No.: US 7,001,264 B2
(45) Date of Patent: Feb. 21, 2006

(54) AIR CONDITIONING DUCT ARRANGEMENT FOR VEHICLE

(75) Inventors: Akihiko Hayashi, Kawachi-gun (JP); Teruki Komura, Nasu-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 10/799,813

(22) Filed: Mar. 12, 2004

(65) Prior Publication Data
US 2004/0185766 A1 Sep. 23, 2004

(30) Foreign Application Priority Data
Mar. 18, 2003 (JP) ........................................ 2003-073980

(51) Int. Cl.
*B60H 1/26* (2006.01)

(52) U.S. Cl. ......................................... 454/144; 454/156
(58) Field of Classification Search ................. 454/144, 454/158, 156, 159
See application file for complete search history.

(56) References Cited
U.S. PATENT DOCUMENTS

| | | | | |
|---|---|---|---|---|
| 3,908,900 A | * | 9/1975 | Smith | 237/12.3 A |
| 4,072,487 A | * | 2/1978 | Irwin | 62/244 |
| 5,308,279 A | * | 5/1994 | Grinberg | 454/139 |
| 5,833,528 A | * | 11/1998 | Baum et al. | 454/151 |
| 5,984,774 A | * | 11/1999 | Upham, III | 454/144 |
| 6,120,370 A | * | 9/2000 | Asou et al. | 454/137 |
| 6,131,652 A | * | 10/2000 | Ito et al. | 165/204 |
| 6,502,895 B1 | * | 1/2003 | Taylor | 296/178 |

FOREIGN PATENT DOCUMENTS

| | | |
|---|---|---|
| JP | 11-254947 | 9/1999 |
| JP | 11-254948 | 9/1999 |
| JP | 2001-63421 | 3/2001 |

* cited by examiner

*Primary Examiner*—Harold Joyce
(74) *Attorney, Agent, or Firm*—Merchant & Gould P.C.

(57) ABSTRACT

An air conditioning duct arrangement for a vehicle includes an air conditioning unit disposed near a rear wheelwell of the vehicle, a floor panel including a lower section, a rise rising from the lower section, and an upper section extending backward from the rise, and a duct which extends from the air conditioning unit in the right-and-left direction of the vehicle in an area behind the rise, and which is formed so as to open forward into a compartment of the vehicle through the rise.

5 Claims, 8 Drawing Sheets

AIR CONDITIONING DUCT ARRANGEMENT FOR VEHICLE

BACKGROUND OF THE INVENTION

1. Field of the Invention

The present invention relates to an air conditioning duct arrangement for a vehicle, and more specifically, the present invention relates to an efficient arrangement of a duct for rear seats.

Priority is claimed on Japanese Patent Application No. 2003-73980, filed Mar. 18, 2003, the content of which is incorporated herein by reference.

2. Description of Related Art

A body frame of a vehicle, in general, includes two side frames which are arranged in the right-and-left direction and each of which extends in the longitudinal direction of the vehicle, and cross members which are arranged one behind another and each of which connects the side frames to each other so as to increase the stiffness of the vehicle body. Due to this structure, in a conventional air conditioning apparatus for a vehicle, by which conditioned air is blown to occupants seated in rear seats, a duct of the air conditioning apparatus is arranged while avoiding interference with the cross members. An air conditioning arrangement, in which an air conditioning unit is disposed near a rear wheelwell, and a duct is disposed on a floor and is formed so as to open upwardly at the front portion of rear seats so that conditioned air is blown upwardly, is disclosed in, for example, Japanese Unexamined Patent Applications, First Publication Nos. Hei 11-254947 and Hei 11-254948).

On the other hand, a floor and seat arrangement, in which a stepped portion, which includes a rise that is raised with respect to a section of the floor located in the front, is formed in the floor so as to accommodate a fuel tank, power train elements, and the like under the floor, and a seat is disposed on the stepped portion, is disclosed in, for example, Japanese Unexamined Patent Application, First Publication No. 2001-63421.

However, in a vehicle having the floor and seat arrangement disclosed in Japanese Unexamined Patent Application, First Publication No. 2001-63421, the height of a seat base of the seat disposed on the stepped portion must be as small as possible in order to ensure an overhead clearance for the occupants seated in the seat while preventing the level of a roof of the vehicle from being too high. Due to this reason, the air conditioning arrangement disclosed in Japanese Unexamined Patent Applications, First Publication Nos. Hei 11-254947 and Hei 11-254948 cannot be employed because the height of the seat base will be increased by an amount corresponding to the height of the duct. In addition, in the case in which the duct is formed so as to open upwardly at the front portion of the rear seat, the conditioned air is blown upwardly and will not be distributed to the entire compartment of the vehicle, and thus the efficiency of air conditioning is decreased, and moreover, because foreign particles tend to enter into the duct, the efficiency of air conditioning may be further decreased due to the foreign particles.

SUMMARY OF THE INVENTION

In view of the above circumstances, an object of the present invention is to provide an air conditioning duct arrangement for a vehicle, including: an air conditioning unit disposed near a rear wheelwell of the vehicle; a floor panel including a lower section, a rise rising from the lower section, and an upper section extending backward from the rise; and a duct which extends from the air conditioning unit in the right-and-left direction of the vehicle in an area behind the rise, and which is formed so as to open forward into a compartment of the vehicle through the rise.

According to the air conditioning duct arrangement described above, because the duct extends from the air conditioning unit in the right-and-left direction of the vehicle in the area behind the rise, and is formed so as to open forward into the compartment of the vehicle through the rise, the position of the duct will not become high even when a stepped portion, which includes the rise so as to be raised with respect to a section of the floor located in the front, is formed in the floor; therefore, the position of the seat is maintained to be low. Moreover, because the duct opens forward into the compartment through the rise, the conditioned air can be distributed to the entire compartment along the floor, and the occupants seated in the front seats can also receive the conditioned air. In addition, entry of foreign particles into the duct can be prevented.

In the above air conditioning duct arrangement, the rise may be formed by a cross member of the vehicle, and the duct may extend along a back surface of the cross member, and then open into the compartment through the cross member.

According to the air conditioning duct arrangement described above, even when the rise is formed by a cross member of the vehicle, the duct is allowed to extend in the area behind the cross member such that the duct extends along the back surface of the cross member in the right-and-left direction of the vehicle, and then opens into the compartment through the cross member. Moreover, the duct can be protected using a next cross member. Even though the duct penetrates the cross member, the effects of increasing the stiffness of the vehicle body by the cross member will not be degraded as long as the cross member does not have cracks at penetrated corners.

In the above air conditioning duct arrangement, a front portion of a seat base of a seat of the vehicle may be disposed on the cross member, the seat base may be arranged in an inclined manner such that the front portion thereof is made higher than a rear portion thereof, and the duct may extend in the right-and-left direction of the vehicle in a space behind the cross member and under the seat base.

According to the air conditioning duct arrangement described above, because the seat base is arranged in an inclined manner such that the front portion thereof is made higher than the rear portion thereof, the overhead clearance for the occupants seated in the rear seats can be ensured while allowing the duct to extend in the right-and-left direction of the vehicle in the space behind the cross member and under the seat base; therefore, the volume of the duct can be increased, and thus efficiency of air conditioning can be improved.

In the above air conditioning duct arrangement, the duct may open forward into the compartment while being inclined downward.

According to the air conditioning duct arrangement described above, because the duct opens forward into the compartment while being inclined downward, the conditioned air can be blown forward and downward. As a result, the conditioned air can be strongly blown, and can reach the front seats.

In the above air conditioning duct arrangement, the duct includes an opening, which opens into the compartment, at a laterally central position of the vehicle.

According to the air conditioning duct arrangement described above, because the duct includes an opening at a laterally central position of the vehicle, the occupants seated in the right seat and left seat can evenly receive the conditioned air. When the conditioned air blown from the center of the opening is directed to the front seats, and the conditioned air blown from the right and left portion of the opening is respectively directed to the right and left, the conditioned air as a whole spreads to the entire compartment.

The above air conditioning duct arrangement may further include distribution fins in the opening, which distribute the conditioned air in the left-and-front direction and in the right-and-front direction.

According to the air conditioning duct arrangement described above, when the conditioned air is blown from the laterally central position of the vehicle, the conditioned air is distributed in the left-and-front direction and in the right-and-front direction by the distribution fins; therefore, the conditioned air evenly and effectively reaches the occupants seated in the right and left seats. Moreover, if there is provided a gap between the seat bases of the front seats and the floor, conditioned air can reach the legs of the occupants seated in the front seats.

DETAILED DESCRIPTION OF THE INVENTION

An embodiment of the air conditioning duct arrangement for vehicles according to the present invention will be explained below with reference to the appended drawings.

Figure 1:
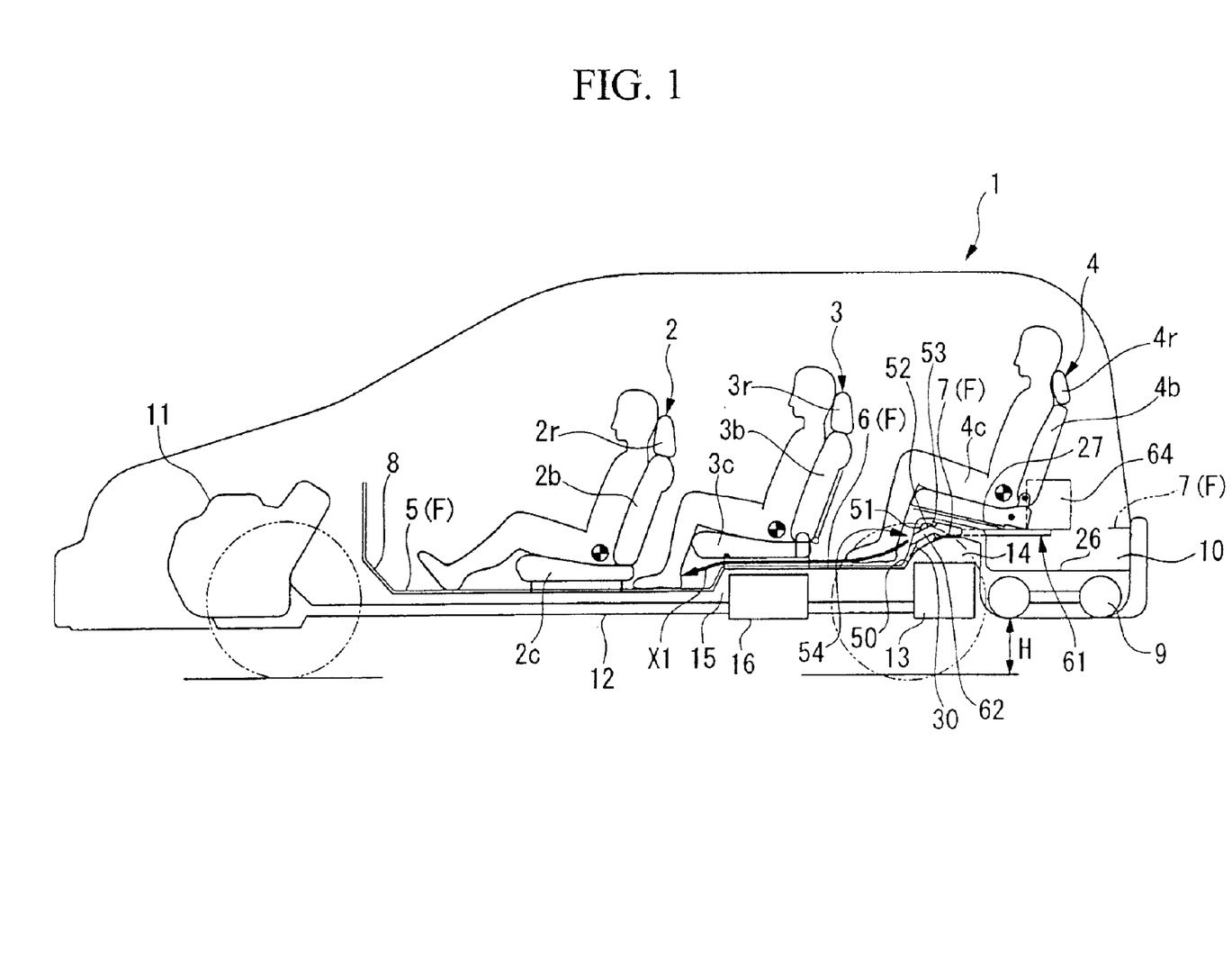
FIG. 1 is a side view showing a vehicle to which an embodiment of an air conditioning duct arrangement for a vehicle according to the present invention is applied.

In FIG. 1, reference numeral 1 indicates a so-called two-box type vehicle. In the vehicle 1, first row seats 2, second row seats 3, and a third row seat 4 are arranged one behind another on a floor F.

A first floor section 5 on which the first row seats 2 are mounted is connected to a second floor section 6 which is located higher than the first floor section 5, and on which the second row seats 3 are mounted. The second floor section 6 is connected to a third floor section 7 which is located higher than the second floor section 6, and on which the third row seat 4 is mounted. The front end of the first floor section 5 is connected to the lower end of a dashboard lower panel 8. The third floor section 7 includes higher portions, which are located in the right and left areas of the third floor section 7, and a lower middle portion. Behind the lower middle portion, there is formed a concave portion 10 for storing a spare tire 9 or the like.

Between the second floor section 6 and the third floor section 7, a rise 50 is formed which extends from the second floor section 6, and which slightly inclines backward at the top thereof. In addition, a cross member 30 having a trapezoidal cross-section extends in the right-and-left direction, and is also disposed so as to continue to the rise 50. More specifically, the cross member 30 includes a rise 51 which slightly inclines backward at an upper portion thereof so as to continue to the rise 50, an upper wall 52 which extends substantially horizontally and backward from the rear end of the rise 51, and a rear wall 53 which extends from the rear end of the upper wall 52 and slightly inclines backward at a lower portion thereof.

The cross member 30 forms a portion of the floor F. The stepped portion 54 of the floor F, which includes the rises 50 and 51, and in which a portion behind the rises 50 and 51 is located higher than a portion in front of the rises 50 and 51, is formed by the rise 50 which rises from the rear end of the second floor section 6, and by the cross member 30 having the rise 51.

The third row seat 4 is located in the middle of the third floor section 7 in terms of the right-and-left direction and above the cross member 30 and the concave portion 10.

An engine 11 is mounted in the front portion of the vehicle 1, and a differential gear box 13, which is connected to a propeller shaft 12 connected to the engine 11, is disposed in a space 14 under the third floor section 7. In addition, a fuel tank 16 is disposed in a space 15 under the second floor section 6. Because the floor F is formed so as to have steps and spaces 14 and 15, the bottom surfaces of the fuel tank 16, of the differential gear box 13, and of the concave portion for storing the spare tire 9 are set at substantially the same level with each other, and thus a minimum ground clearance H, which is determined by these bottom surfaces, is sufficiently ensured.

Figure 2:
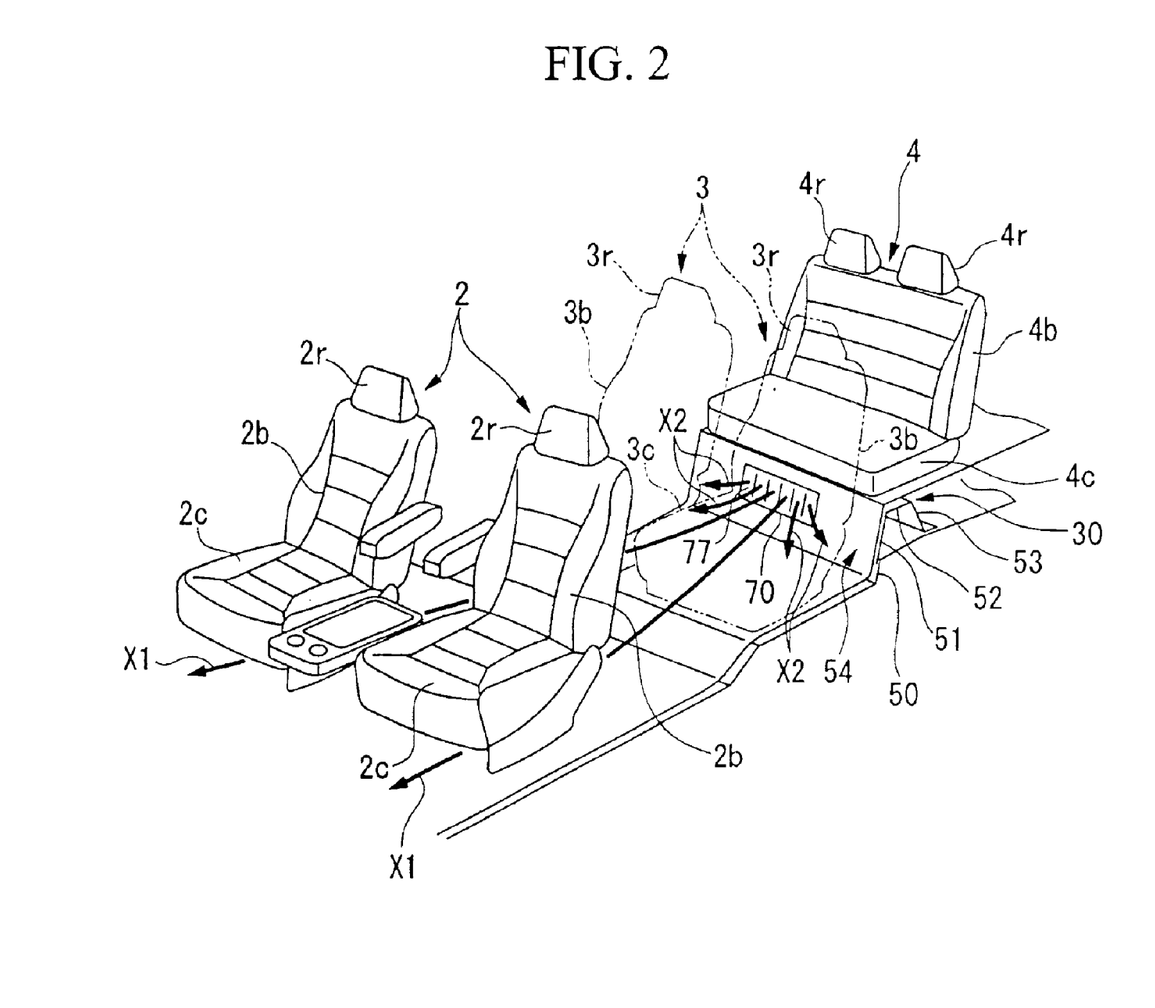
FIG. 2 is a perspective view showing an interior of the vehicle.

As shown in FIG. 2, basically, the seats 2, 3, and 4 respectively include seat bases 2c, 3c, and 4c, and seatbacks 2b, 3b, and 4b, each of which is supported by the corresponding seat base in a pivotable manner. The first and second row seats 2 and 3 include separate seats disposed side by side, respectively. The third row seat 4 is a so-called bench seat. The seat backs 2b, 3b, and 4b of the first, second, and third row seats 2, 3, and 4 are provided with headrests 2r, 3r, and 4r, respectively.

Figure 3:
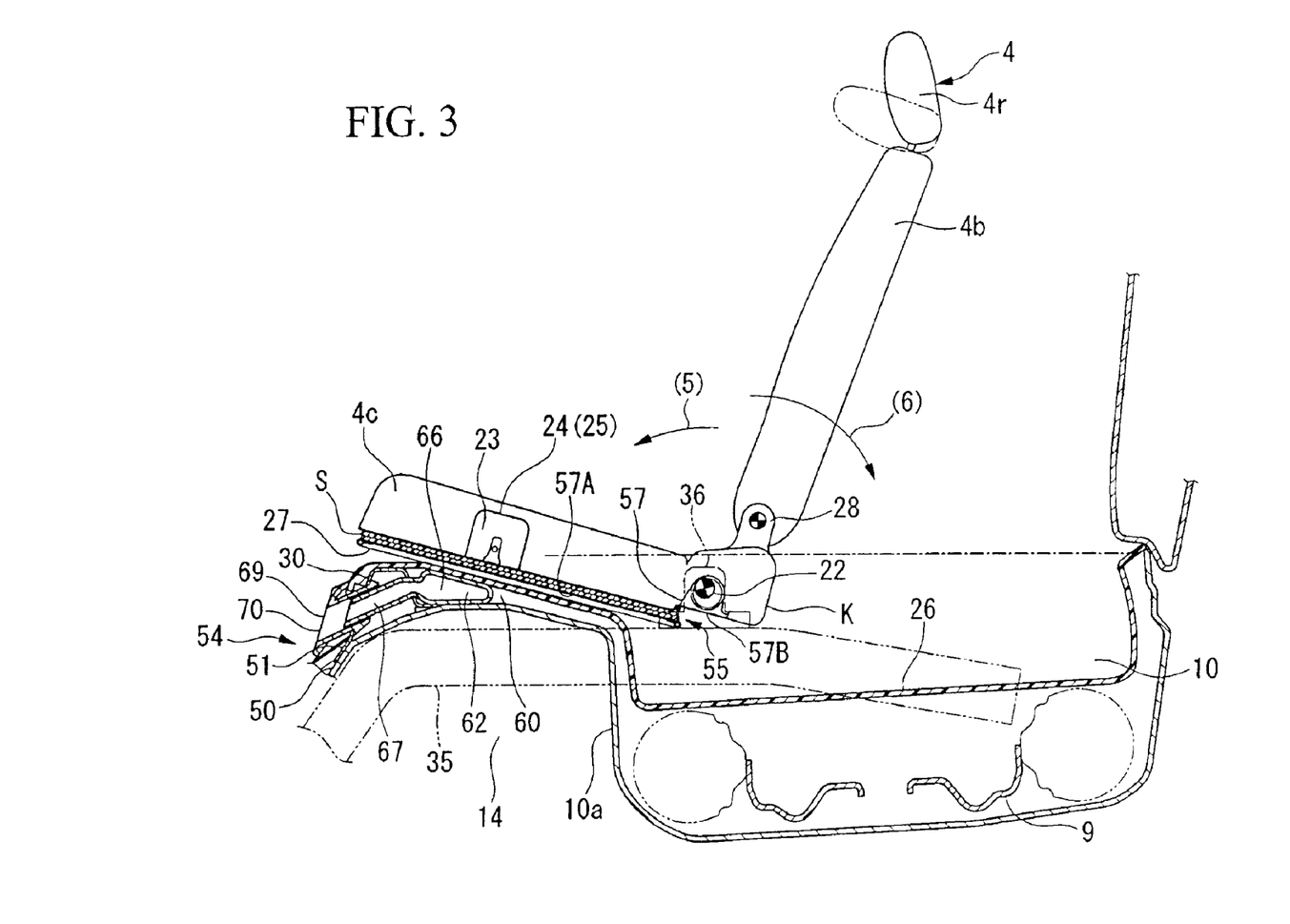
FIG. 3 is a side view showing a third row seat, in a non-stowed state, of the vehicle to which the embodiment of the air conditioning duct arrangement for a vehicle according to the present invention is applied.

As shown in FIG. 3, the third seat 4 includes the seats base 4c and the seatback 4b, and is disposed in front of the above-mentioned concave portion 10 in a state for allowing the occupants to be seated therein. More specifically, the seat base 4c is mounted in an inclined manner such that the front portion of the seat base 4c is located above the cross member 30 which is disposed in front of the concave portion 10, and the rear portion of the seat base 4c is disposed in the concave portion 10, i.e., the seat base 4c of the third row seat 4 is inclined such that the front portion of the seat base 4c is located above the cross member 30, and the rear portion thereof is located at a level below the upper surface of the cross member. The third row seat 4 is a foldable seat in which the seatback 4b is pivotable forward so as to be placed on the seat base 4c. The third row seat 4 in a folded state can be rotated backward, in a stowing process, and can be stowed, in a substantially horizontal state, in an upper portion of the concave portion 10 for the spare tire 9.

Figure 4:
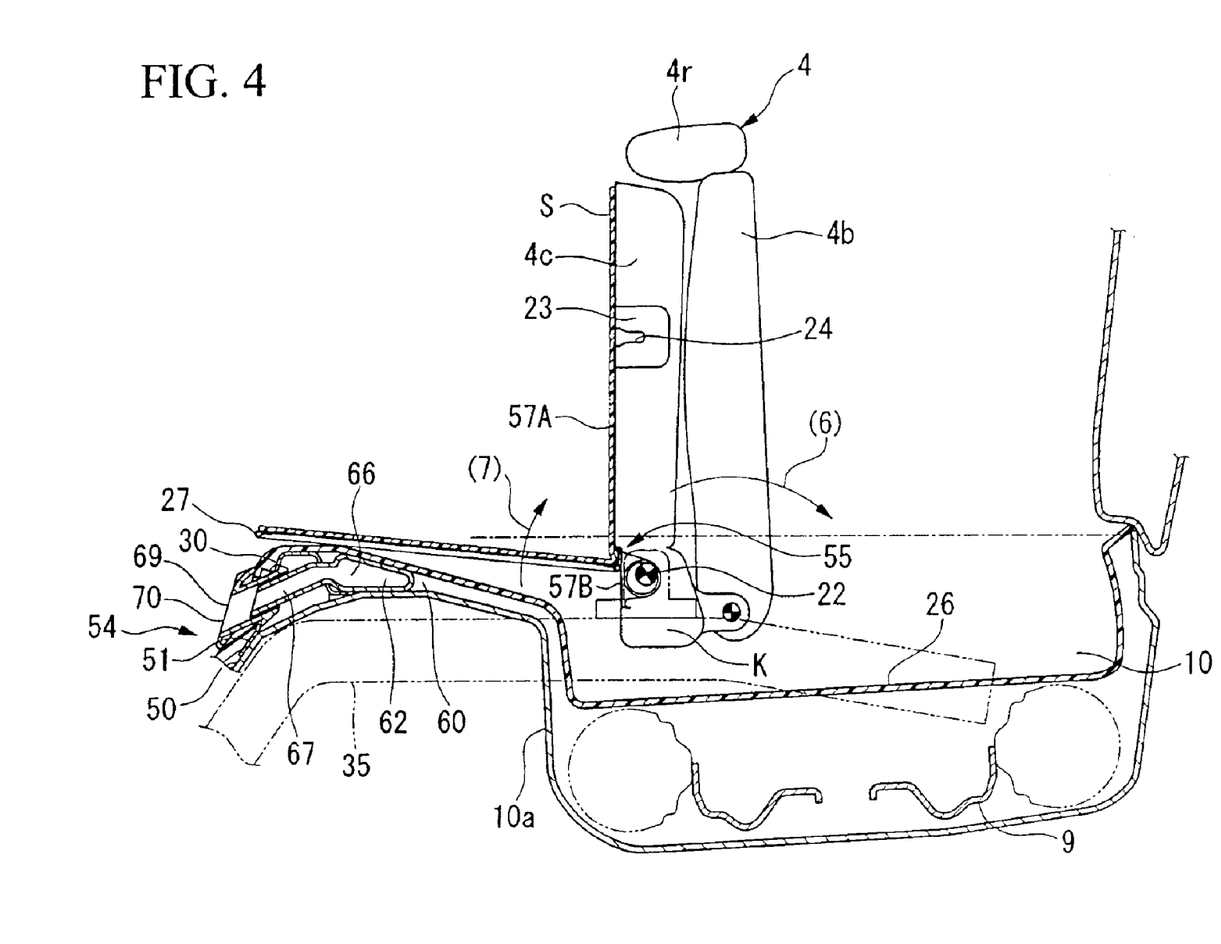
FIG. 4 is a side view showing the third row seat, in the process of stowing, of the vehicle to which the embodiment of the air conditioning duct arrangement for a vehicle according to the present invention is applied.
Figure 5:
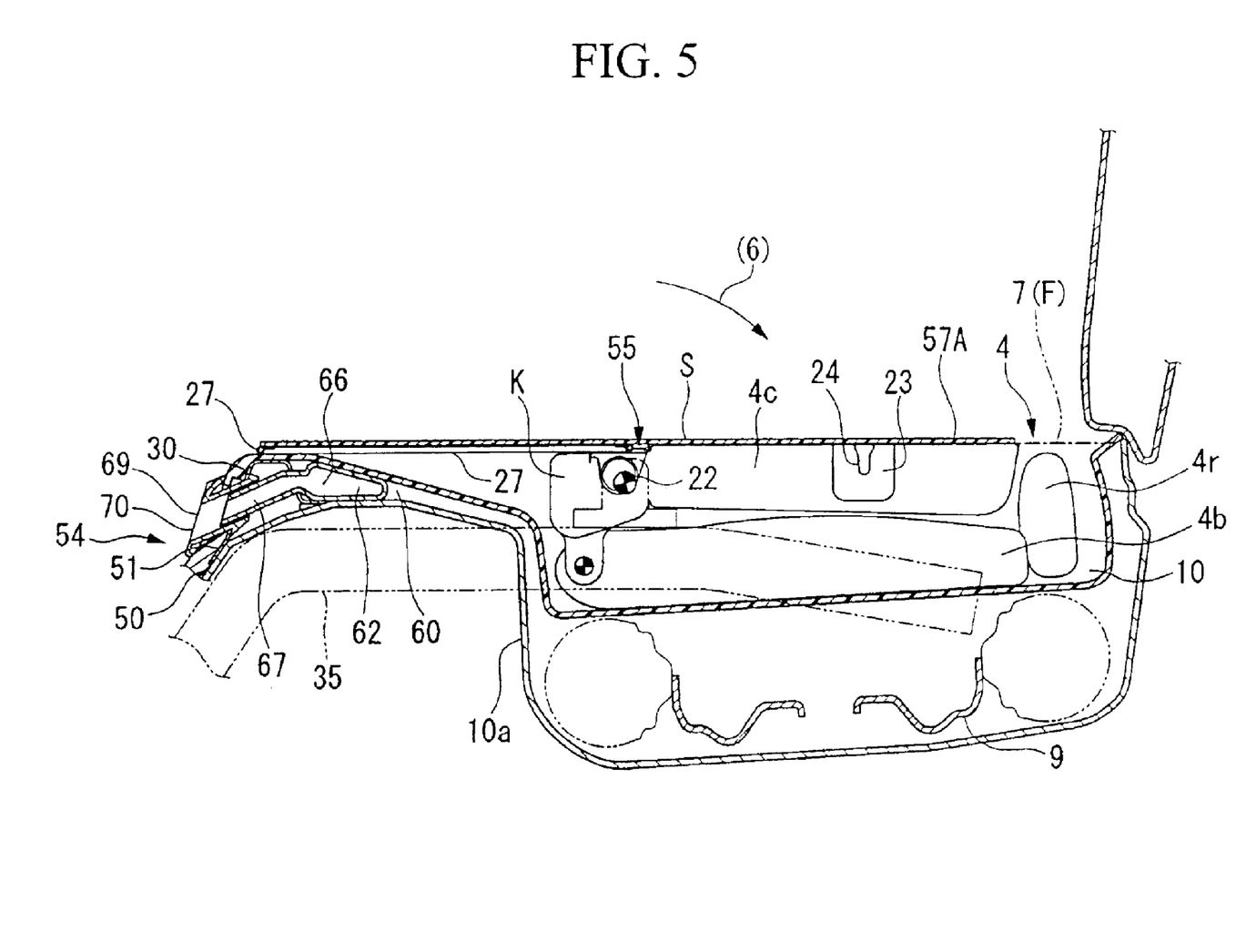
FIG. 5 is a side view showing a third row seat, in a stowed state, of the vehicle to which the embodiment of the air conditioning duct arrangement for a vehicle according to the present invention is applied.

More specifically, as shown in FIGS. 3 to 5, the seat base 4c of the third row seat 4 is provided with a horizontally projecting support shaft 22 on the side faces and in the rear portion thereof. The seat base 4c of the third row seat 4 is pivotably supported by vehicle body elements located at the right and left of the concave portion 10. More specifically, the support shaft 22 penetrates through the seat base 4c of the third row seat 4 and through the side walls of the concave portion 10, and the support shaft 22 is pivotably supported by side frames 35, which extend in the longitudinal direction along side portions of the vehicle body, via support brackets 36.

Moreover, the seat base 4c of the third row seat 4 is provided with engagement brackets 23, which open downward, on the side faces and in the front portion thereof. The third row seat 4 is prevented from being pivoted forward by engaging engagement pins 25 projecting from the side walls (not shown) of the vehicle 1 with engagement portions 24 of the engagement brackets 23.

As explained above, the third row seat 4 is supported in such a manner that the rear portion of the seat base 4c is supported by using the support shaft 22 which is directly supported by the side frames 35, the front portion of the seat base 4c is supported by the engagement pins 25 via the engagement brackets 23, and the seat base 4c is mounted in an inclined manner such that the front portion of the seat base 4c is located above the cross member 30 which is disposed in front of the concave portion 10, and the rear portion of the seat base 4c is disposed in the concave portion 10. The occupants of the vehicle 1 are seated in the third row seat 4 supported in the above-described manner.

The seatback 4b of the third row seat 4 is, at the lower end thereof, supported by the rear portion of the seat base 4c using a hinge bracket 28. The headrest 4r is supported by the upper end of the seatback 4b in a forwardly tiltable manner.

On the bottom wall of the concave portion 10, there are placed the spare tire 9 and tools (not shown), and a floor sheet 26 is provided so as to cover the upper face of the spare tire 9. The floor sheet 26, a portion of which is disposed in the concave portion 10, extends upward along a front wall 10a of the concave portion 10, and further extends forward and upwardly so as to cover the cross member 30, and then extends forward and downwardly along the rise 51 of the cross member 30 and the rise 50 disposed under the rise 51.

A flat board 27 is placed on a portion of the floor sheet 26 located above the cross member 30. The rear end of the flat board 27 is hung from the rear portion of the third row seat 4 in an upright position using a link mechanism 55 which is a rotational connection mechanism.

The flat board 27 is a plate-shaped element made of metal or resin, which extends along the underside of the seat base 4c and from the front portion thereof to the rear portion thereof near the support shaft 22.

A seat base frame 57 is provided on the underside of the seat base 4c of the third row seat 4. As shown in FIGS. 3 to 5, the seat base frame 57 is formed in a stepped shape, and includes end surface 57A occupying most portion thereof, and placement surface 57B which is disposed at the rear portion, as viewed in the upright position, of the seat base 4c, and which is shifted, when compared with the end surface 57A, toward the upper face of the seat base 4c by an amount corresponding to the thickness of the flat board 27. The placement surface 57B is in parallel to the end surface 57A, and the placement surface 57B and the end surface 57A together form the underside of the seat base 4c.

A sheet element S, which is made of material having flexibility such as resin, is adhered to substantially the entire upper surface of the flat board 27. The sheet element S is folded at the rear portion of the flat board 27 as viewed in the upright position of the third row seat 4, and further extends along to the underside of the end surface 57A seat base 4c while being adhered thereto.

The rear end of the flat board 27 is located so as to interfere with a rotational locus of a rear end K of the seat base 4c of the third seat 4; therefore, the rear end of the flat board 27 is raised upward by the rear end K during the stowing process of the third seat 4. When the third seat 4 is stowed, the flat board 27 bridges the third seat 4 and the cross member 30, and thus a flat and rigid cargo space is formed by the back face of the seatback 4b of the third seat 4, the third floor section 7, and the upper surface of the cross member 30. In other words, the rear end K of the seat base 4c of the third seat 4 is disposed under the rear portion of the flat board 27 during the stowing process of the third seat 4, and the flat board 27 bridges the placement surface 57B of the seat base 4c and the cross member 30 which forms a portion of the floor F located in front of the concave portion 10.

Accordingly, when the third row seat 4, which is normally placed in the upright position as shown in FIG. 3, is stowed through the steps of tilting forward the seatback 4b of the third row seat 4 about the hinge bracket 28 (as indicated by the arrow (5) in FIG. 3), tilting forward the headrest 4r (as shown in FIG. 4), disengaging the engagement pins 25 of the vehicle body from the engagement portions 24 of the engagement brackets 23 of the seat base 4c, and rotating backward the seat base 4c and the seatback 4b about the support shaft 22 (as indicated by the arrow (6) in FIG. 4), the rear end K of the seat base 4c of the third seat 4 abuts against the placement surface 57B as shown in FIG. 4, and the rear end K is dispose under the rear portion of the flat board 27 as shown in FIG. 5. At this stage, the rear end of the flat board 27 is raised upward by the third row seat 4 (as indicated by the arrow (7) in FIG. 4), and thus the flat board 27, which is normally placed under the third row seat 4, is placed on the third row seat 4.

When the third row seat 4 is further rotated while being helped by the weight of the third row seat 4 (as indicated by the arrow (6) in FIG. 5), the third row seat 4 is folded so as to be flush with the third floor section 7 and is stowed in the concave portion 10 and above the spare tire 9, and the space in front of the concave portion 10 is naturally closed by the flat board 27, as shown in FIG. 5. Because the rear portion of the flat board 27 is connected to the seat base 4c via the link mechanism 55 so that the distance between the rear portion of the flat board 27 and the seat base 4c is maintained to be constant, the flat board 27 is placed at a predetermined position on the placement surface 57B which is shifted, when compared with the end surface 57A, toward the upper face of the seat base 4c by an amount corresponding to the thickness of the flat board 27, and thus the flat board 27 is made flush with the back face 4A of the seat base 4c. The upper surface of the floor sheet 26 placed on the cross member, the upper surface of the flat board 27, and the back face 4A of the seat base 4c of the third row seat 4 are covered by the sheet element S without a gap.

As explained above, the front end of the flat board 27 is supported by the floor sheet 26 placed on the cross member 30, and the rear end of the flat board 27 is hung from the rear portion of the seat base 4c of the third row seat 4 in the upright position using the link mechanism 55; therefore, a space 50 is formed behind the cross member 30, which is surrounded by the cross member 30, the third floor section, and the flat board 27. Because the front end of the flat board 27 is supported by the floor sheet 26 placed on the cross member 30, and the rear end of the flat board 27 moves, during the stowing process, in an area which is positioned above the position of the rear end of the flat board 27 when the third seat 4 is in the upright position, the space 60 is minimized when the third seat 4 is in the upright position. An air duct 62 of an air conditioning apparatus 61 is constructed so as to be accommodated in the minimized space 60.

Figure 6:
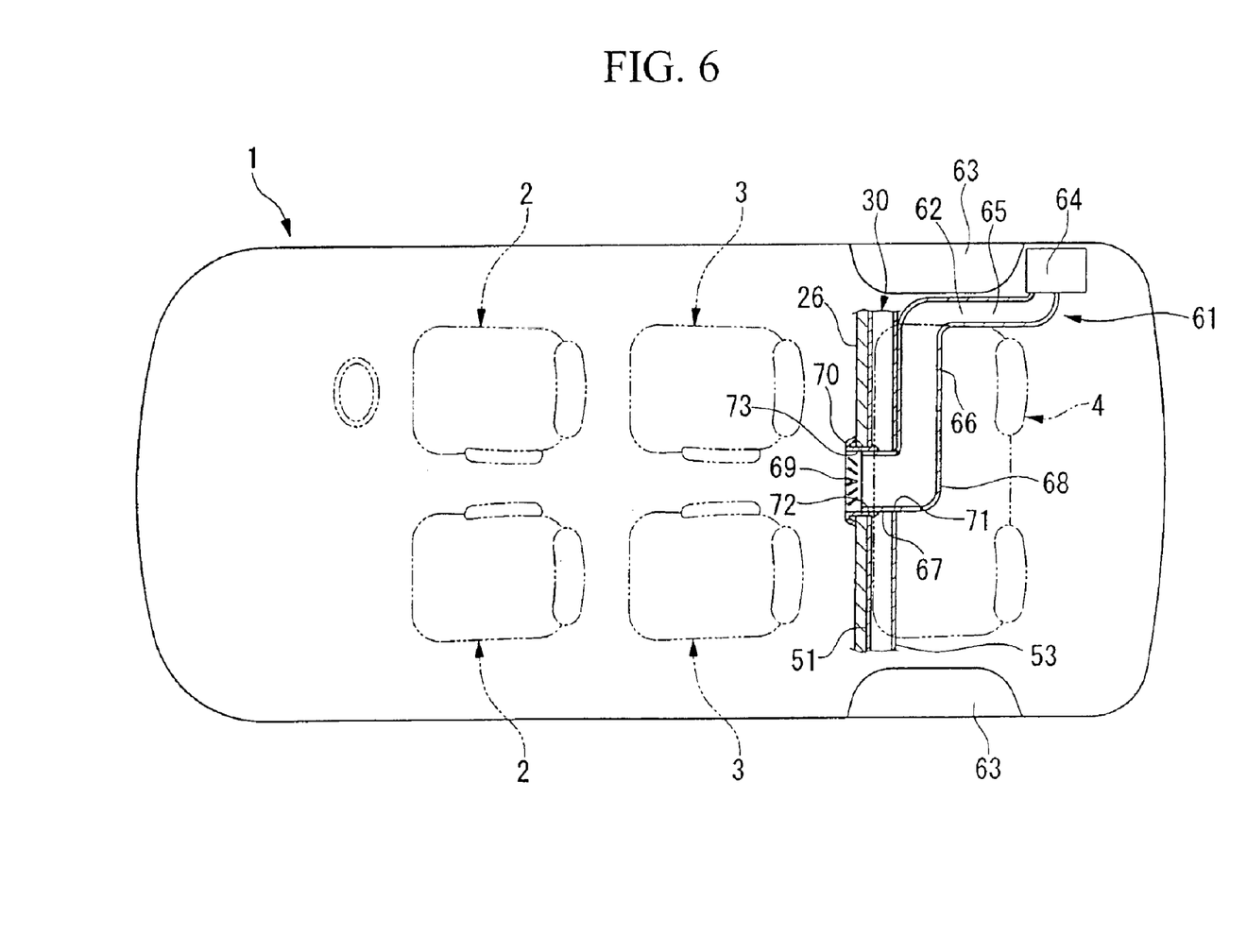
FIG. 6 is a plan cross-sectional view showing an air conditioning apparatus and the like installed in the vehicle to which the embodiment of the air conditioning duct arrangement for a vehicle according to the present invention is applied.

As shown in FIGS. 1 and 6, the air conditioning apparatus 61 is disposed near the rear wheel of the vehicle 1, more specifically, near a wheelwell 63 for the right-rear wheel, and more specifically, the air conditioning apparatus 61 is disposed behind the wheelwell 63. The air conditioning apparatus 61 includes an air conditioning unit 64 which draws air in the compartment and blows the air after warming as necessary, and the air duct 62 which guides the conditioned air coming blown by the air conditioning unit 64 to predetermined locations in the compartment.

As shown in FIG. 6, the air duct 62 includes a duct main body 68 having a first longitudinal guide portion 65 which extends substantially horizontally and in the longitudinal direction from the air conditioning unit 64 to the cross member 30, a lateral guide portion 66 which extends substantially horizontally and in the lateral direction in an area behind the cross member 30, i.e., behind the rise 50, from the front end of the longitudinal guide portion 65 to the center of the vehicle 1 in terms of the right-and-left direction, and a second longitudinal guide portion 67 which extends forward from the end of the lateral guide portion 66 located at the center of the vehicle 1, and which penetrates through the rear wall 53 of the cross member 30 and the rise 51 so as to open forward, and a duct cover 70 which is provided at the end of the second longitudinal guide portion 67, and which forms an opening 69 that opens forward through the rise 51 toward the compartment.

Figure 7:
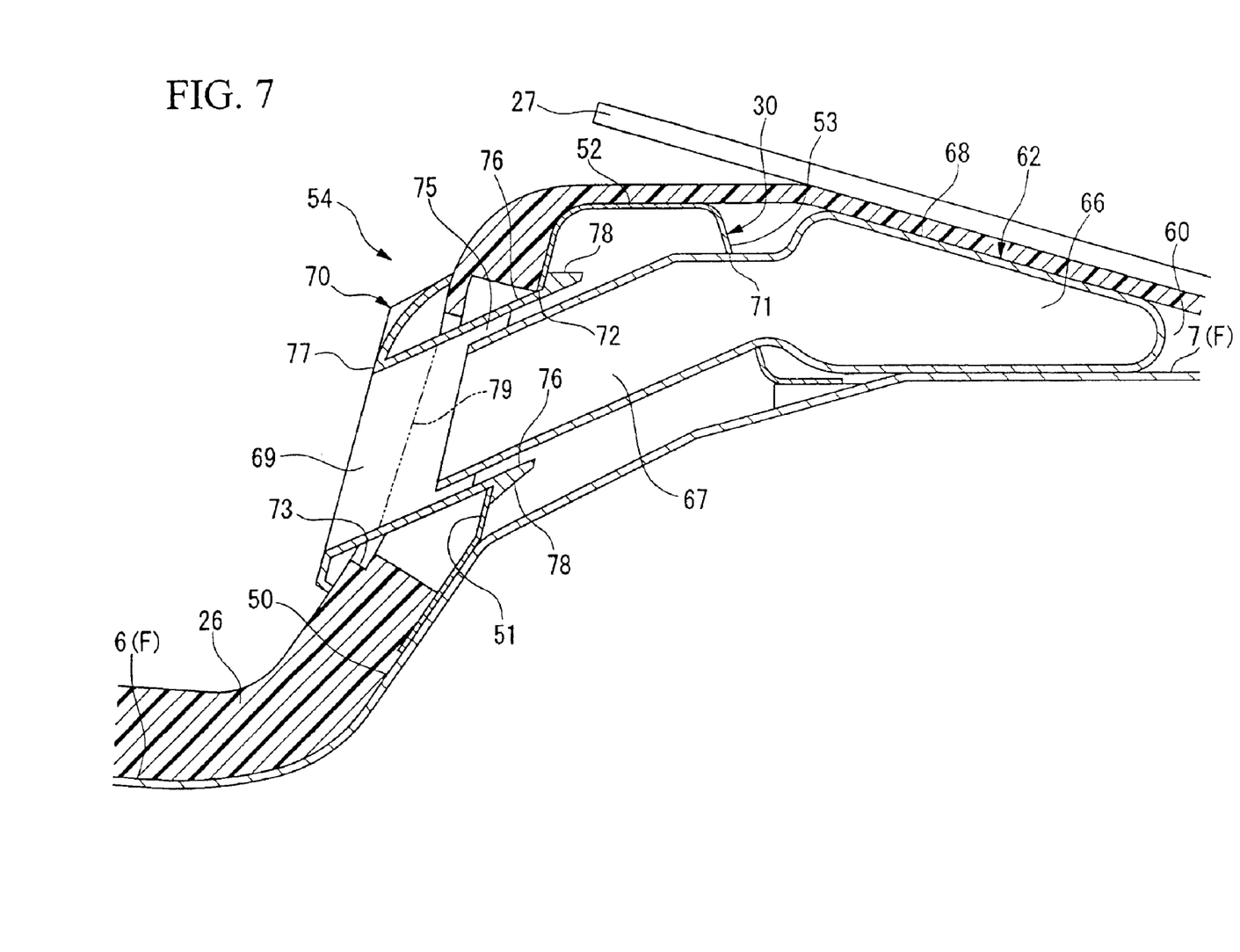
FIG. 7 is a side cross-sectional view showing a main portion of the embodiment of the air conditioning duct arrangement for a vehicle according to the present invention.

As shown in FIG. 7, the lateral guide portion 66 of the duct main body 68 is disposed in the space 60 that is surrounded by the cross member 30, the third floor section 7, and the flat board 27, i.e., disposed in the space 60 located behind the cross member 30 and under the seat base 4c of the third row seat 4, and extends along the cross member behind the same. The second longitudinal guide portion 67 penetrates through a hole 71 formed in the rear wall 53 of the cross member 30 at the laterally central position, and through a hole 72 formed in the rise 51 at the laterally central position, and extends forward. The second longitudinal guide portion 67 is formed so as to be inclined such that a front portion thereof is positioned lower than a rear portion thereof, i.e., the second longitudinal guide portion 67 extends forward and slightly downward from the lateral guide portion 66. The duct cover 70, which is disposed at the front end of the second longitudinal guide portion 67, opens into the compartment while closing a hole 73 which is formed in the floor sheet 26 at the laterally central position so as to correspond to the hole 72 formed in the rise 51. Even though the duct main body 68 penetrates through the holes 71 and 72 formed in the cross member 30, the effects of increasing the stiffness of the vehicle body by the cross member 30 will not be degraded as long as the cross member 30 does not have cracks at penetrated corners.

The duct cover 70 includes a tubular portion 75, extending plate portions 76 which respectively extend from the vertical sides and horizontal sides of an end of the tubular portion 75 in the direction along which the tubular portion 75 extends, and a cover portion 77 which extends outwardly along a plane crossing the tubular portion 75 from the other end of the tubular portion 75. Each of the extending plate portions 76 is provided with an engagement tongue 78 which projects from each of the extending plate portions 76 outwardly as viewed from the center of the tubular portion 75. When the duct cover 70 is assembled with the cross member 30, the extending plate portions 76 are inserted, from the compartment, into the gaps between the peripheries of the hole 73 in the floor sheet 26 and of the hole 72 in the cross member and the outer surface of the duct main body 68. In this process, the engagement tongues 78 move along the hole 72 while the extending plate portions 76 deform elastically. When the engagement tongues 78 pass through the hole 72, the engagement tongues 78 engage the back surface of the rise 51 as a result of elastic return of the extending plate portions 76, and thus the duct cover 70 is assembled with the cross member 30. In this assembled state, the tubular portion 75 overlaps the second longitudinal guide portion 67, the duct cover 70, i.e., the opening 69 of the air duct 62 is disposed at the laterally central position, and the cover portion 77 closes the gap between the periphery of the hole 73 formed in the floor sheet 26 and the tubular portion 75.

Figure 8:
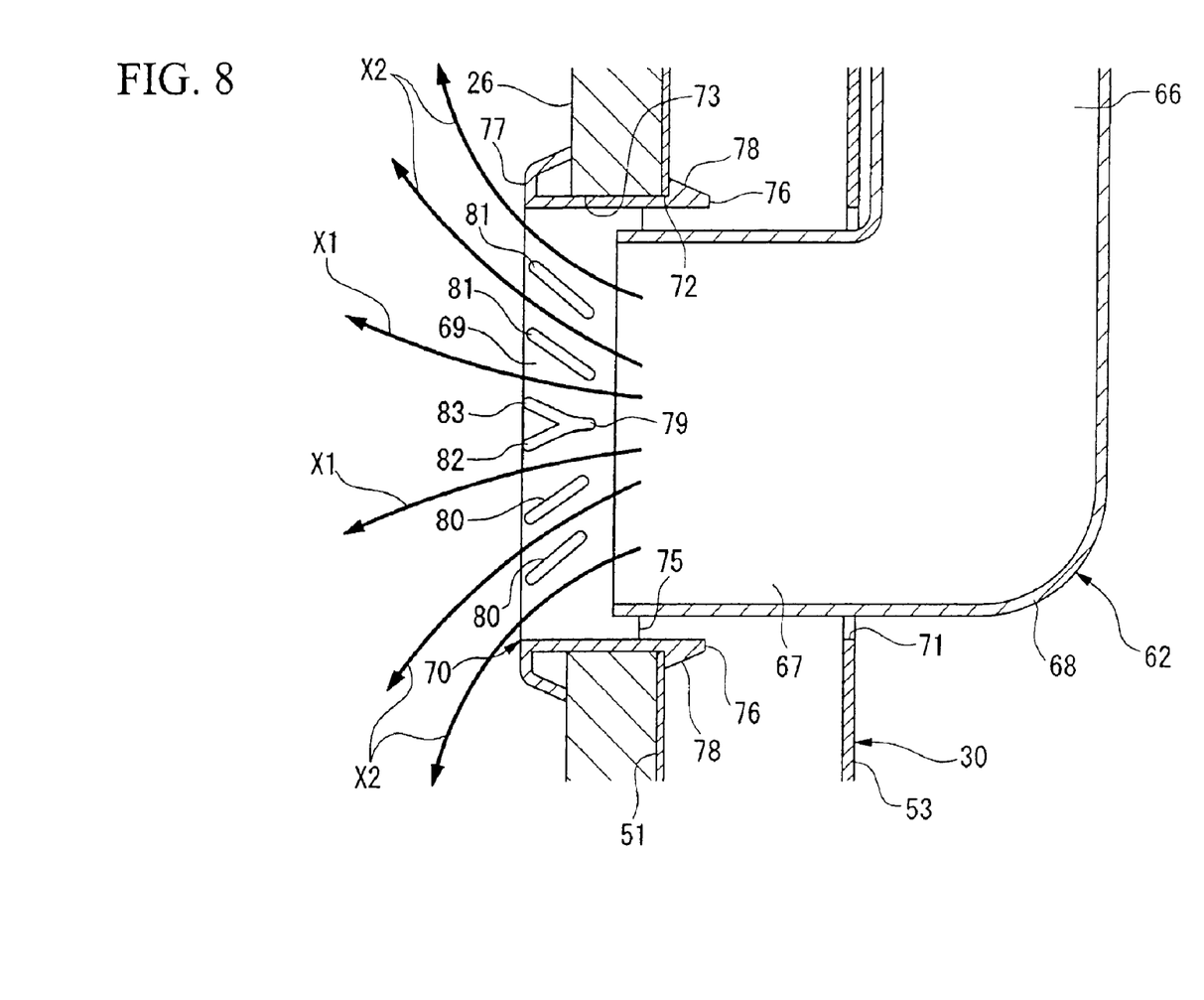
FIG. 8 is a plan cross-sectional view showing the main portion of the embodiment of the air conditioning duct arrangement for a vehicle according to the present invention.

As shown in FIG. 8, in the tubular portion 75, distribution fins 79 to 81, each of which extends vertically, are arranged in the right-and-left direction. Among the distribution fins 79 to 81, the center fin 79 located at the laterally central position is formed in a V-shape in plan view, and includes a pair of fin portions 82 and 83 that connected to each other at the second longitudinal guide portion 67 side thereof, and diverge from each other at the compartment side. In the left of the center fin 79, there are provided left side fins 80 each of which extends in substantially parallel to the fin portion 82 disposed in the left, and in the right of the center fin 79, there are provided right side fins 81 each of which extends in substantially parallel to the fin portion 83 disposed in the right. Accordingly, in the opening 69 of the air duct 62, there are provided distribution fins 79 to 81 for distributing the conditioned air in the left-and-front direction and in the right-and-front direction, and the conditioned air will not be blown from the laterally central position of the opening 69. More specifically, the center fin 79 and the side fins 81 and 82 adjacent to the center fin 79 direct the conditioned air at the center of the opening 69 to the front seats, i.e., to a leg space in front of the second row seats 3 and a leg space in front of the first row seats 2 (indicated by the arrows X1 in FIGS. 1, 2, and 8). The side fins 81 and 82 disposed further at the right and left direct the conditioned air at the right and left portion of the opening 69 so as to be apart from each other, and to a leg space in front of the third row seat 4 (indicated by the arrows X2 in FIGS. 1, 2, and 8). As a result, the conditioned air can be distributed to the entire compartment.

According to the above embodiment, because the air duct 62 extends from the air conditioning unit 64 in the right-and-left direction of the vehicle in the area behind the rise 51, and is formed so as to open forward into the compartment of the vehicle through the rise 51, the position of the air duct 62 will not become high even when the stepped portion 54, which includes the rises 50 and 51 so as to be raised with respect to a section of the floor F located in the front, is formed in the floor F; therefore, the position of the third row seat 4 is maintained to be low. Accordingly, the air duct 62 is efficiently arranged while preventing the third row seat 4 from being located at a high level, and ensuring sufficient overhead clearance. Moreover, because the air duct 62 opens forward into the compartment through the rise 51, the conditioned air can be distributed to the entire compartment along the floor F, and the occupants seated in the second row seats 3 and in the first row seats 2 can also receive the conditioned air, and thus the efficiency of air conditioning can be increased. In addition, entry of foreign particles into the air duct 62, which tends to occur if the air duct 62 opens upwardly, can be prevented, and degradation of the efficiency of air conditioning due to the foreign particles can be avoided.

The rise 51 is included in the cross member 30 so that the stiffness of the vehicle body is ensured. The air duct 62 extends in the right-and-left direction and behind the cross member 30, and then opens into the compartment through the holes 71 and 72 formed in the cross member 30, i.e., the air duct 62 is allowed to extend in the right-and-left direction using the space 60 behind the cross member 30.

In addition, the air duct 62 can be protected by the cross member 30 adjacent thereto. More specifically, when the third seat 4 is stowed away, the weight of the occupant may be applied to the air duct 62; however, because the upper surface of the air duct 62 is covered by the cross member 30 disposed in front of the air duct 62 and by the flat board 27 that is connected to the third row seat 4, the air duct 62 can be protected.

Furthermore, because the seat base 4c of the third row seat 4 is arranged in an inclined manner such that the front portion thereof is made higher than the rear portion thereof, the overhead clearance for the occupants seated in the third row seat can be ensured while allowing the air duct 62 to extend in the right-and-left direction of the vehicle 1 in the space 60 located behind the cross member 30 and under the seat base 4c; therefore, the air duct 62 can be arranged in a space saving manner, and the volume of the air duct 62 can be increased, and thus efficiency of air conditioning can be improved.

Moreover, because the air duct 62 opens forward into the compartment while being inclined downward, the conditioned air can be blown forward and downward. As a result, the efficiency of air conditioning (or efficiency of heating) can be improved. Furthermore, because the conditioned air can be strongly blown, the conditioned air can reach the front seats.

In addition, because the air duct 62 includes the opening 69 at a laterally central position of the vehicle 1, the occupants seated in the right seat and left seat can evenly receive the conditioned air. Moreover, if there is provided a gap between the seat bases of the front seats and the floor, conditioned air can reach the legs of the occupants seated in the front seats.

Furthermore, because the conditioned air blown from the laterally central position of the vehicle 1 is distributed in the left-and-front direction and in the right-and-front direction by the distribution fins 79 to 81, the conditioned air evenly and effectively reaches the occupants seated in the right and left seats. In addition, because the conditioned air at the center of the opening 69 is directed to the front seats, i.e., to a leg space in front of the second row seats 3 and a leg space in front of the first row seats 2 (indicated by the arrows X1 in FIGS. 1, 2, and 8), and the conditioned air at the right and left portion of the opening 69 is directed so as to be apart from each other, and to a leg space in front of the third row seat 4 (indicated by the arrows X2 in FIGS. 1, 2, and 8), the conditioned air can be distributed to the entire compartment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Advantageous Effects Obtained by the Invention

As explained above, according to the air conditioning duct arrangement for a vehicle of the present invention, because the duct extends from the air conditioning unit in the right-and-left direction of the vehicle in the area behind the rise, and is formed so as to open forward into the compartment of the vehicle through the rise, the position of the duct will not become high even when a stepped portion, which includes the rise so as to be raised with respect to a section of the floor located in the front, is formed in the floor; therefore, the position of the seat is maintained to be low. Accordingly, the duct is efficiently arranged while preventing the seat from being located at a high level, and ensuring sufficient overhead clearance. Moreover, because the duct opens forward into the compartment through the rise, the conditioned air can be distributed to the entire compartment along the floor, and the occupants seated in the front seats can also receive the conditioned air, and thus the efficiency of air conditioning can be improved. In addition, entry of foreign particles into the duct can be prevented, and thus degradation of the efficiency of air conditioning due to the foreign particles can be avoided.

According to another air conditioning duct arrangement of the present invention, even when the rise is formed by a cross member of the vehicle, the duct is allowed to extend in the area behind the cross member such that the duct extends along the back surface of the cross member in the right-and-left direction of the vehicle, and then opens into the compartment through the cross member. Moreover, the duct can be protected using a next cross member. Even though the duct penetrates the cross member, the effects of increasing the stiffness of the vehicle body by the cross member will not be degraded as long as the cross member does not have cracks at penetrated corners.

According to another air conditioning duct arrangement of the present invention, because the seat base is arranged in an inclined manner such that the front portion thereof is made higher than the rear portion thereof, the overhead clearance for the occupants seated in the rear seats can be ensured while allowing the duct to extend in the right-and-left direction of the vehicle in the space behind the cross member and under the seat base; therefore, the volume of the duct can be increased, and thus efficiency of air conditioning can be improved.

According to another air conditioning duct arrangement of the present invention, because the duct opens forward into the compartment while being inclined downward, the conditioned air can be blown forward and downward. As a result, the conditioned air can be strongly blown, and can reach the front seats.

According to another air conditioning duct arrangement of the present invention, because the duct includes an opening at a laterally central position of the vehicle, the occupants seated in the right seat and left seat can evenly receive the conditioned air. When the conditioned air blown from the center of the opening is directed to the front seats, and the conditioned air blown from the right and left portion of the opening is respectively directed to the right and left, the conditioned air as a whole spreads to the entire compartment.

According to another air conditioning duct arrangement of the present invention, when the conditioned air is blown from the laterally central position of the vehicle, the conditioned air is distributed in the left-and-front direction and in the right-and-front direction by the distribution fins; therefore, the conditioned air evenly and effectively reaches the occupants seated in the right and left seats. Moreover, if there is provided a gap between the seat bases of the front seats and the floor, the conditioned air can reach the legs of the occupants seated in the front seats.

What is claimed is:

1. An air conditioning duct arrangement for a vehicle, comprising:

an air conditioning unit disposed near a rear wheelwell of the vehicle;

a floor panel including a lower section, a rise rising from the lower section, and an upper section extending backward from the rise; and a duct which extends from the air conditioning unit in the right-and-left direction of the vehicle in an area behind the rise, and which is formed so as to open forward into a compartment of the vehicle through the rise, wherein the rise is formed by a cross member of the vehicle, and the duct extends along a back surface of the cross member, and then opens into the compartment through the cross member, a floor sheet disposed on the cross member having a hole through which the duct opens into the compartment; and a duct cover covering a periphery of the hole in the floor sheet and having an engagement tongue which is engageable with the cross member; and wherein a front portion of a seat base of a seat of the vehicle is disposed on the cross member, the seat base is arranged in an inclined manner such that the front portion thereof is made higher than a rear portion thereof, the duct extends in the right-and-left direction of the vehicle in a space behind the cross member and under the seat base, and the space is defined by the cross member and the floor panel.

2. An air conditioning duct arrangement according to claim 1, wherein the duct opens forward into the compartment while being inclined downward.

3. An air conditioning duct arrangement according to claim 1, wherein the duct includes an opening, which opens into the compartment, at a laterally central position of the vehicle.

4. An air conditioning duct arrangement according to claim 3, further comprising distribution fins in the opening, which distribute conditioned air in the left-and-front direction and in the right-and-front direction.

5. An air conditioning duct arrangement according to claim 1, wherein the floor panel includes a concave portion in which the seat in a folded state is stowed, and the seat is provided with a flat board pivotally connected thereto which is maintained to be disposed an the cross member when the seat is stowed in the concave portion.

* * * * *